United States Patent [19]

Allen

[11] Patent Number: 5,690,054

[45] Date of Patent: Nov. 25, 1997

[54] AQUARIUM SYSTEM

[76] Inventor: Steven D. Allen, 94 Sunrise Ct., Fletcher, N.C. 28732

[21] Appl. No.: 626,727

[22] Filed: Apr. 1, 1996

[51] Int. Cl.$^6$ .................................................. A01K 63/04
[52] U.S. Cl. .................................................. 119/259
[58] Field of Search .................................. 119/226, 227, 119/245, 259, 260, 261, 262, 264, 269

[56] References Cited

U.S. PATENT DOCUMENTS

| | | | |
|---|---|---|---|
| 3,487,935 | 1/1970 | Lovitz | 119/259 X |
| 3,512,646 | 5/1970 | Willinger | 119/259 X |
| 3,785,342 | 1/1974 | Rogers | 119/259 |
| 4,081,377 | 3/1978 | Carrington | 119/259 X |
| 4,216,090 | 8/1980 | Dockery | 119/259 X |
| 4,752,388 | 6/1988 | Ng | 119/259 X |
| 4,894,151 | 1/1990 | Woltmann | 119/259 X |
| 5,160,431 | 11/1992 | Marioni | 119/259 X |

*Primary Examiner*—Thomas Price
*Attorney, Agent, or Firm*—Michael E. Smith

[57] ABSTRACT

An aquarium system, consisting of a transparent-sided waterproof tank with flanges which support an undergravel filter with side inlet holes and a cleanout. The system also includes a base which supports the tank and encloses and screens a clean-out and drain system. The floor of the tank is translucent or transparent, and is shaped to provide one or more depressed areas into which aquarium wastes are directed by gravity and water flow, and from which the drain system allows the wastes and stale water to be removed without vacuuming.

4 Claims, 3 Drawing Sheets

AQUARIUM SYSTEM

BACKGROUND OF THE INVENTION

1. Field of the Invention

The present invention relates to an aquarium system that permits convenient and efficient cleaning, and more particularly, to the shape and function of the aquarium bottom in accumulating, concentrating and removing waste, allowing a fast, simple means of both determining cleaning needs and performing the cleaning. The undergravel filter provides for the removal of aquarium wastes from the entire aquarium including the aquarium edges, and provides a center cleanout for removal of larger waste particles. The aquarium system provides a filter system, a drain system for the removal of wastes, an attractive base, support for the aquarium tank, access to the underneath of the aquarium from one or more sides, and versatility in the design, manufacture and placement of the aquarium.

2. Brief Description of the Prior Art

It is common practice, and recommended by many fish experts, to perform routine weekly partial water changes in aquariums, by removing 5 to 10 percent of the water volume to prevent stale water, remove accumulated wastes, lessen the effects of overfeeding, keep stress on the biological components to a minimum, and to maintain the filter system in proper working order. It is also necessary to physically remove waste products, which result from the biological process of elimination or decay, as well as from overfeeding. This is usually performed by siphoning or "vacuuming" the gravel and undergravel filter from the top of the tank, by changing filters, or by removing all water and refilling the aquarium tank. All of these methods have drawbacks, including being very time-consuming, hazardous to the biological component because of extreme variations in water quality or temperature, and being messy hard work for the aquarium keeper. The present invention avoids these drawbacks by providing a method for accumulating aquarium wastes at the bottom of the aquarium tank with a provision for fast, efficient removal of wastes and the recommended volume of water.

There have been numerous aquarium inventions that include sloping bottoms with drains. U.S. Pat. No. 475,082 to Gunther discloses a fish-tank with a discharge opening, but only in combination with a means of introducing water through pipes inside the aquarium, which mechanically stirs and removes the waste products. The present invention does not disclose any means of introducing or directing jets of water, which would tend to mix the wastes with remaining water rather than efficiently removing the wastes. U.S. Pat. No. 4,098,082 to Jackson discloses an aquarium with a bottom drain and an area underneath an inclined gravel filter, but includes a filter system with multiple openings communicating between the tank proper and the section underneath the filter and an aeration system, and further teaches a flat aquarium bottom surface. U.S. Pat. No. 4,807,565 to Hawthorne teaches an aquarium system with a support base similar to the instant invention, but also encompasses water pump and air circulation means. Hawthorne discloses a "funnelform bottom" with a complex filter and valve system, unlike the simple, inexpensive drain means herein disclosed. Each of these inventions has been a commercial failure due to inefficient shape of the bottom, restrictions on the available situations where the aquarium may be placed, or complexity causing manufacturing expense. Aquarium keepers have long felt the need for an aquarium system which allows maintenance with reduced effort, time and expense, which is met by the invention herein disclosed.

SUMMARY OF THE INVENTION

I have developed a new and improved aquarium system which uses an inexpensive adaptation of existing undergravel filters in an aquarium tank supported on a base which conceals and supports a bottom drain system. The aquarium tank has the appearance of aquarium tanks common in the art, but has the added features of a support flange upon which the undergravel filter is supported, and, below the filter, one or more accumulation areas, with a total volume approximately five to ten percent of the volume of the entire aquarium tank. The bottom of the accumulation area is made of transparent or translucent material, and is sloped, either with planar or concave segments, in such a manner that wastes, trapped by the undergravel filter fall to the bottom and are then moved by gravity to the lowest portion, at which point a drain opening is provided. When the aquarium keeper desires to clean the aquarium system, one or more removable side segments of the base are taken off, allowing the keeper to view the accumulation area. The keeper may thereby determine whether sufficient wastes have accumulated and whether cleaning is required. By opening a valve under the drain, the keeper may use the provided drain hose to draw off both water and accumulated wastes. Unlike siphoning from above, fish, plants, decorations and gravel, located above the undergravel filter, are undisturbed by the water being drawn off.

If drawing water off through the drain system fails to remove all wastes, the keeper may open the clean-out access located in the undergravel filter and use a siphon to remove wastes from the accumulation area. This process is facilitated by the ability to see through the accumulation area bottom.

The undergravel filters common in the art draw waste-containing water from the top of the filter, through the gravel, and recirculate the filtered water through holes or towers. As wastes accumulate, the gravel is contaminated, and decay processes create an unhealthy situation for life in the aquarium tank, as well as an unsightly condition and unpleasant smells. The present invention provides inlet holes through the sides of the undergravel filter, along the sides of the aquarium tank, where the filter is supported on flanges above the accumulation area. Wastes do not accumulate in the gravel, but fall through to the accumulation area below.

In addition to disguising the presence of the drain, valve and drain hose, and supporting the aquarium tank above the surface where it is located, the base may be constructed in such a manner as to provide longer or shorter legs, and may be constructed of various attractive materials. It is a feature of this invention that the construction of the base may be such as to provide different styles and appearances. The base is provided with one or more side segments which are attached to the legs by any of several different attachments, such as, for instance, magnetic fasteners, allowing quick and easy removal and reattachment without tools. The base may be made of any suitable material. However, if suitable support means for the aquarium tank is otherwise provided, the base consisting of support legs and side segments, may be omitted.

It is a feature of this invention that it may be used to provide any size of aquarium tank, from beginner setups to large tanks.

DETAILED DESCRIPTION OF THE INVENTION

Many variations and modifications of the embodiments of the invention will be apparent to those skilled in the art without departing from the scope of the invention, which is defined in the claims appended hereto.

Figure 1:
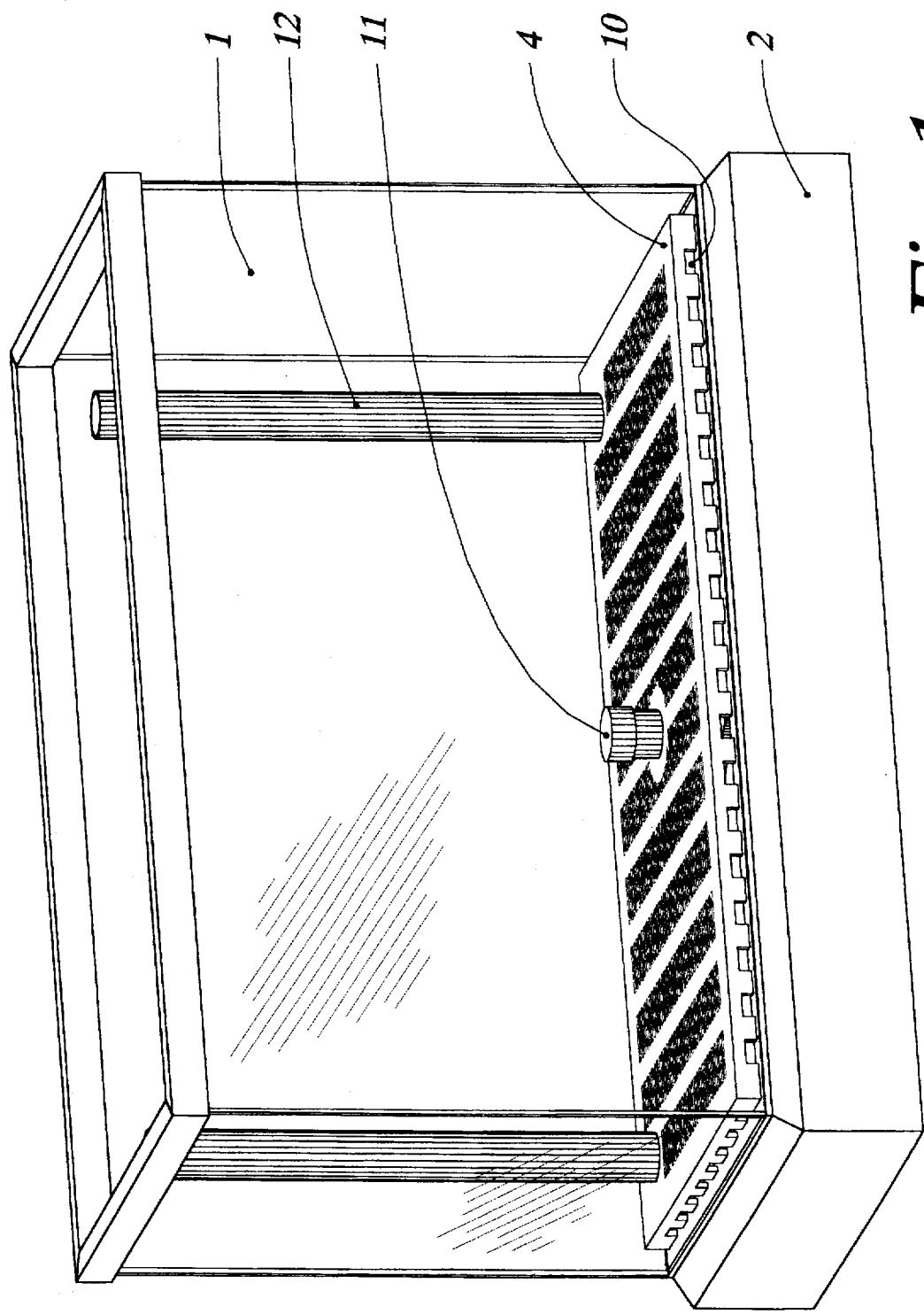
FIG. 1 is a pictorial representation of a preferred embodiment of the invention.
Figure 2:
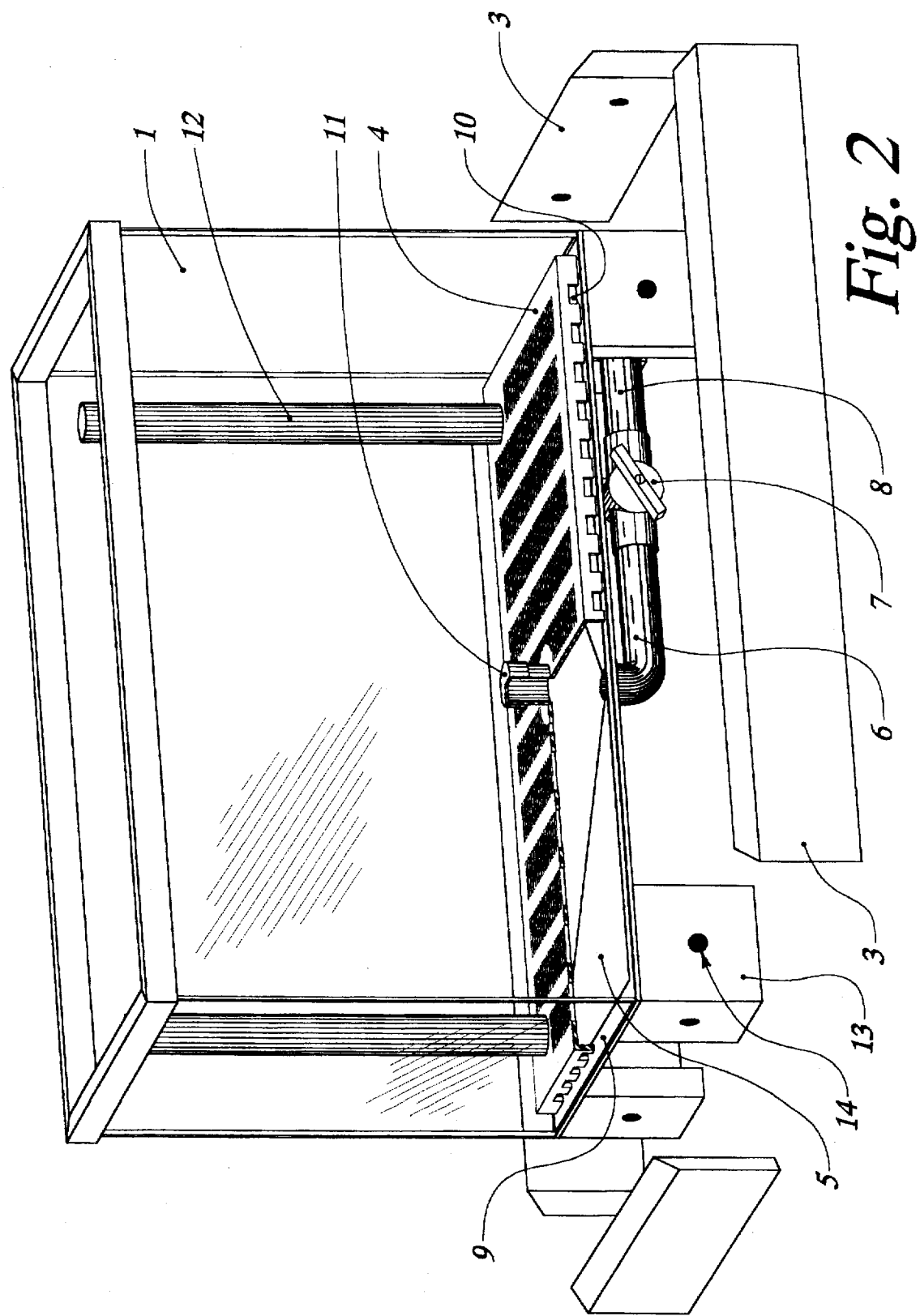
FIG. 2 is a pictorial representation of a preferred embodiment of the invention from the same perspective as FIG. 1, showing the component parts of the invention.
Figure 3:
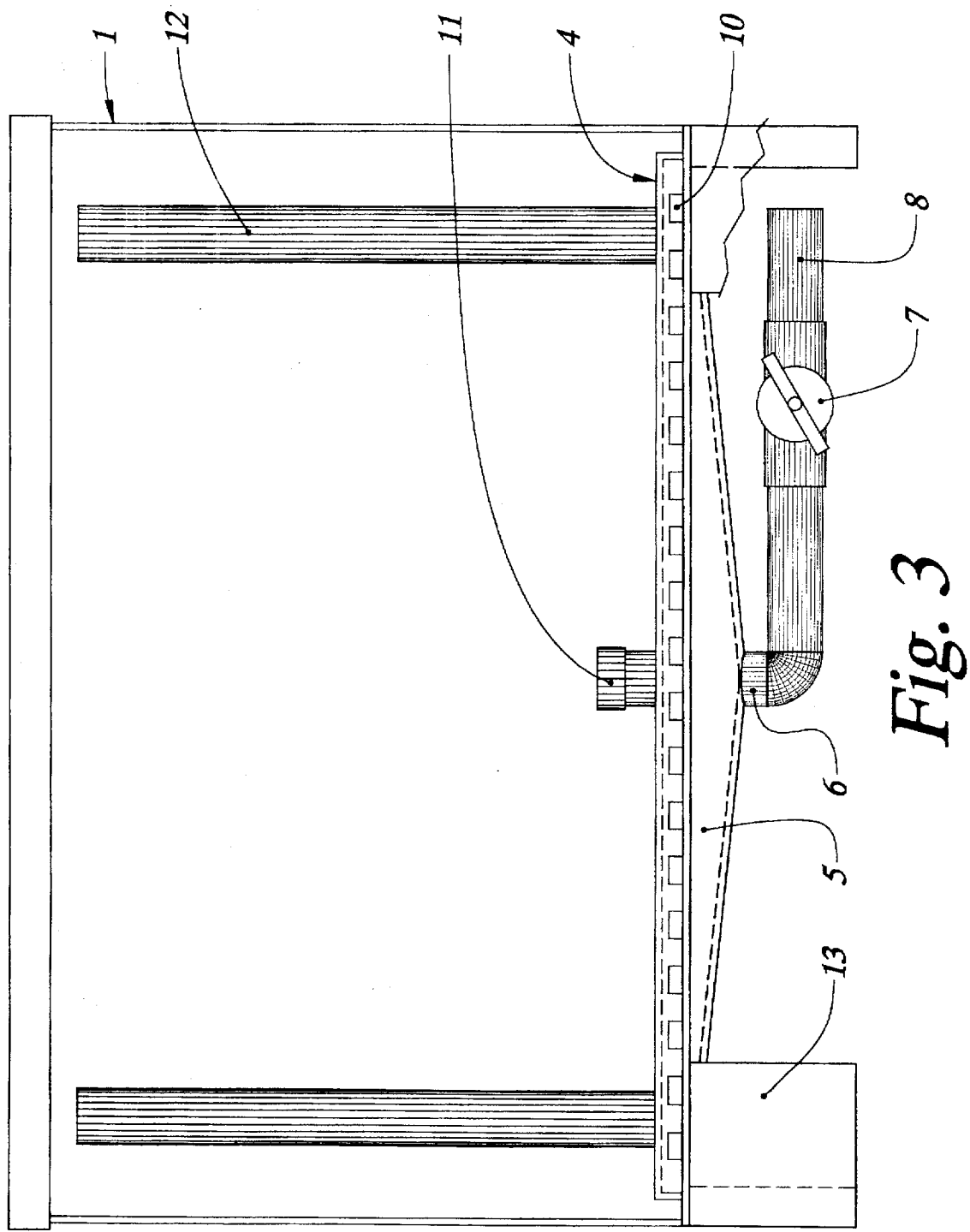
FIG. 3 is a cut-away view of the invention in side elevation.

Referring now to the figures, which depict a preferred embodiment of the invention, FIG. 1 shows a side view of the invention. FIG. 2 is a view of the preferred embodiment from the same angle, showing the transparent walls 1, the base 2, and the undergravel filter 4 with side inlet holes 10, clean-out opening 11 and filter towers 12, with base side sections 3 removed for cleaning. This exposes accumulation area 5, drain 6, valve 7, and drain hose 8 to view. Also in this figure, undergravel filter 4 is cut away to allow viewing of the component parts of the invention. Drain 6 is situated at the lowest point of accumulation area 5. Accumulation area 5 is made of transparent or translucent material, which allows the person cleaning the aquarium to determine if sufficient waste materials are present so that the aquarium needs cleaning, and following cleaning, if the aquarium system is sufficiently clean. The lowest point of accumulation area 5 with drain 6 may be located at any point below the undergravel filter 4 or, if desired, an embodiment may have two or more drains. Accumulation area 5 may be of various sizes, and may be shaped with flat bottom segments as shown in this preferred embodiment or may be of any generally concave shape. In general, the accumulation area 5 should be of a volume approximately equal to five to fifteen percent of the total volume of the aquarium. Accumulation area 5 may be of various sizes, and may be shaped with flat bottom segments as shown in this preferred embodiment or may be of any generally concave shape. In general, the accumulation area 5 should be of a volume approximately equal to five to fifteen percent of the total volume of the aquarium. This preferred embodiment depicts an aquarium system with a single accumulation area 5. It is permissible to provide multiple accumulation areas, each with associated drain 6, which should have a combined volume equal to five to fifteen percent of the total volume of the aquarium. Valve 7 may be of various types common in the art which permit flow of water and wastes. Clean-out opening 11 may be opened and a siphon of a type commonly used may be inserted to remove wastes which do not drain through drain 6. Valve 7 may be of various types common in the art which permit flow of water and wastes. Clean-out opening 11 may be opened and a siphon of a type commonly used may be inserted to remove wastes which do not drain through drain 6.

Undergravel filter 4 is a rigid filter of a type common in the art. For any particular aquarium system, an undergravel filter 4 of a size appropriate to fit within the aquarium and rest on lower support flanges 9 will be used. Gravel will be placed on top of undergravel filter 4 and water flow will pull water through the gravel and filter, where wastes are removed by mechanical and gravity action. Filtered water will exhaust through filter towers 12. Wastes will then fall to the bottom of accumulation area 5, and will be pulled by gravity to the location of drain 6. Undergravel filters are not commonly equipped with side inlet holes, and side inlet holes 10, through which wastes may also be drawn into the filter and removed from the aquarium water, are a feature of the invention.

Base 2 consists of legs 13, base side sections 3 and fastener means 14. Legs 13 may be of any appropriate size, and may be long enough to provide a floor standing aquarium system as well as a table standing aquarium system as shown in this embodiment.

Base side sections 3 may be attached with any removable fastener. In this embodiment, the base side sections 3 are attached with magnetic fasteners 14, allowing easy removal for access to accumulation area 5 and drain 6. Drain 6 allows water and wastes to flow into drain hose 8 through valve 7. Drain hose 8 may be of any material and of any appropriate size. Base side sections 3 may be attached with any removable fastener. In this embodiment, the base side sections 3 are attached with magnetic fasteners 14, allowing easy removal for access to accumulation area 5 and drain 6. Drain 6 allows water and wastes to flow into drain hose 8 through valve 7. Drain hose 8 may be of any material and of any appropriate size. This embodiment of the invention includes legs 13 which provide clearance for the accumulation areas 5 and associated drain means, as well as base side sections 3 which screen the accumulation areas 5 from view. If other support means are provided, base side sections 3 and legs 13 may be omitted.

The embodiments described above are merely descriptive of its principles and are not to limit the scope of the invention set out in the following claims.

What is claimed is:

1. An aquarium system wherein water is filtered by drawing aquarium water through a filter system below which wastes concentrate in an accumulation area from which the wastes are drawn off, said system comprising:

a watertight fish tank of transparent material having sides extending vertically from a bottom, lower support flanges, an undergravel filter, composed of a rigid support grating with outflow towers and side inlet holes allowing passage of water from said tank into and through said undergravel filter, supported on said lower support flanges, said bottom being made of transparent or translucent material, having segments sloping toward a drain opening, said segments forming an accumulation area extending from the lower support flanges to a lowest point, said drain opening located at said lowest point, a drain hose connected to said drain opening, a valve located within said drain hose, and an extension of said drain hose, all supported by an exterior base with support legs at each corner of said watertight fish tank, said support legs of a height at least sufficient to support said drain hose and valve above any support surface, said base comprising said support legs, removable base side sections on each side of said base, and removable fastening means for each base side section.

2. An aquarium system as defined in claim 1 wherein more than one accumulation area with associated drain opening, drain hose and valve is incorporated.

3. An aquarium system as defined in claim 1, wherein said undergravel filter includes a clean-out opening means, consisting of a centrally located hole and removable cap.

4. An aquarium system as defined in claim 1, wherein the base comprising support legs, base side sections and fastening means is omitted.

* * * * *